(12) United States Patent
Picha et al.

(10) Patent No.: US 6,585,296 B1
(45) Date of Patent: Jul. 1, 2003

(54) TUBE SEALING ASSEMBLY

(75) Inventors: Neil R. Picha, Petaluma, CA (US); James E. Johnson, Sebastopol, CA (US)

(73) Assignee: Innovadyne Technologies, Inc., Santa Rosa, CA (US)

(*) Notice: Subject to any disclaimer, the term of this patent is extended or adjusted under 35 U.S.C. 154(b) by 0 days.

(21) Appl. No.: 09/695,011

(22) Filed: Oct. 23, 2000

(51) Int. Cl.[7] .................................................. F16L 39/00
(52) U.S. Cl. .............................. 285/124.1; 285/382.1; 285/279; 285/9.2
(58) Field of Search .......................... 285/121.4, 382.1, 285/382.2, 382, 9.2, 124.1, 124.3, 124.4, 124.5, 279

(56) References Cited

U.S. PATENT DOCUMENTS

| | | | |
|---|---|---|---|
| 3,820,828 A | * 6/1974 | Fiddler | 285/124.3 |
| 3,973,792 A | 8/1976 | Gonner | |
| 4,083,702 A | 4/1978 | Hartigan et al. | |
| 4,669,756 A | 6/1987 | Cassaday et al. | |
| 4,991,883 A | 2/1991 | Worden | |
| 5,540,464 A | * 7/1996 | Picha | 285/328 |
| 5,578,157 A | * 11/1996 | Higdon | 156/278 |
| 5,601,785 A | * 2/1997 | Higdon | 285/382 |
| 6,193,286 B1 | * 2/2001 | Jones et al. | 285/343 |
| 6,267,143 B1 | * 7/2001 | Schick | 285/124.1 |

OTHER PUBLICATIONS

Copy of Rheodyne Catalog 2001, pp. 26 and 27, Jan. 2001.

* cited by examiner

Primary Examiner—Lynne H. Browne
Assistant Examiner—Aaron Dunwoody
(74) Attorney, Agent, or Firm—Beyer Weaver & Thomas LLP

(57) ABSTRACT

A high pressure be seating assembly adapted for liquid sealing against a rigid surface having a connecting conduit. The tube sealing assembly includes a rigid, elongated, tube member having a spherical sector-shaped distal end portion with a radius substantially larger than the radius of the tube member. The tube member further includes a central conduit terminating at an apex of the spherical sector-shaped distal end portion to define an annular rim portion such that a fluid-tight seal can be formed between the central conduit of the tube member and the connecting conduit of the surface. This seal is formed at a contact interface between the rim portion and the surface when a relative axial force is applied therebetween.

53 Claims, 5 Drawing Sheets

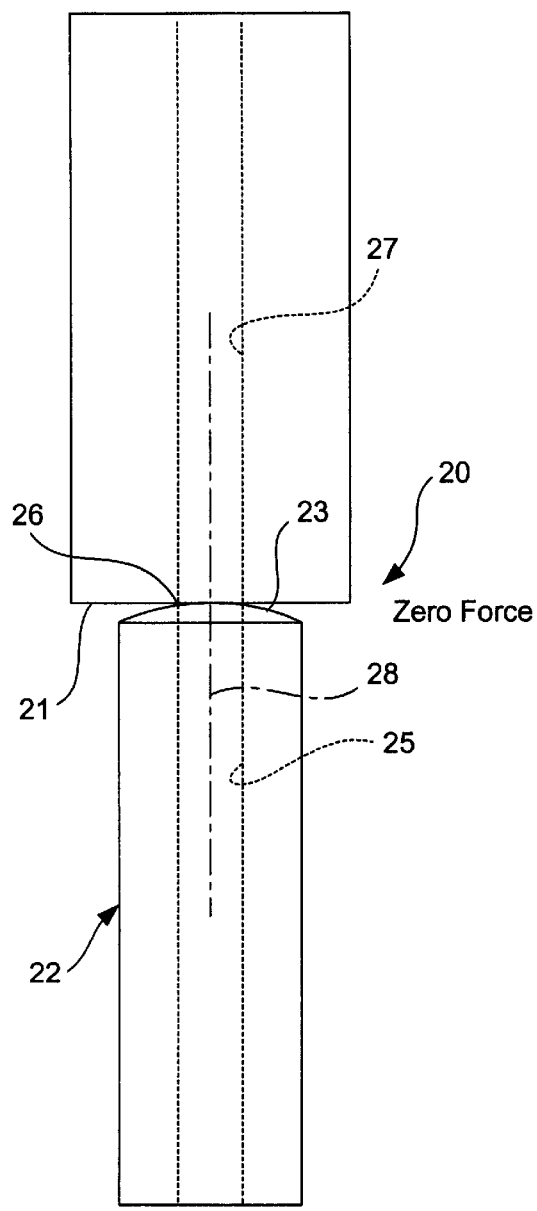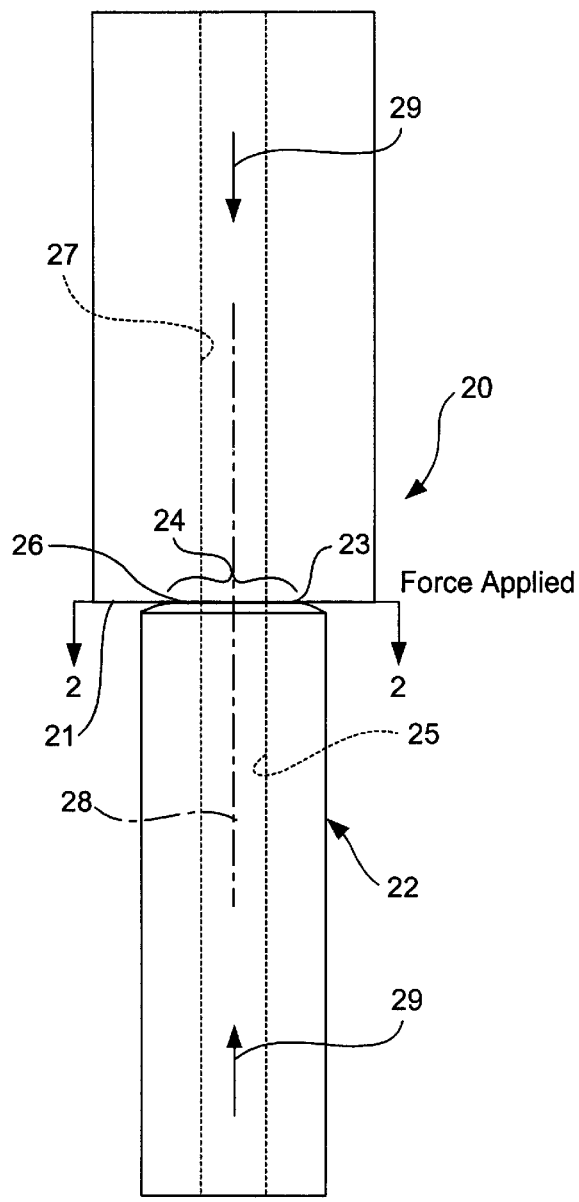
FIG. 1A    FIG. 1B

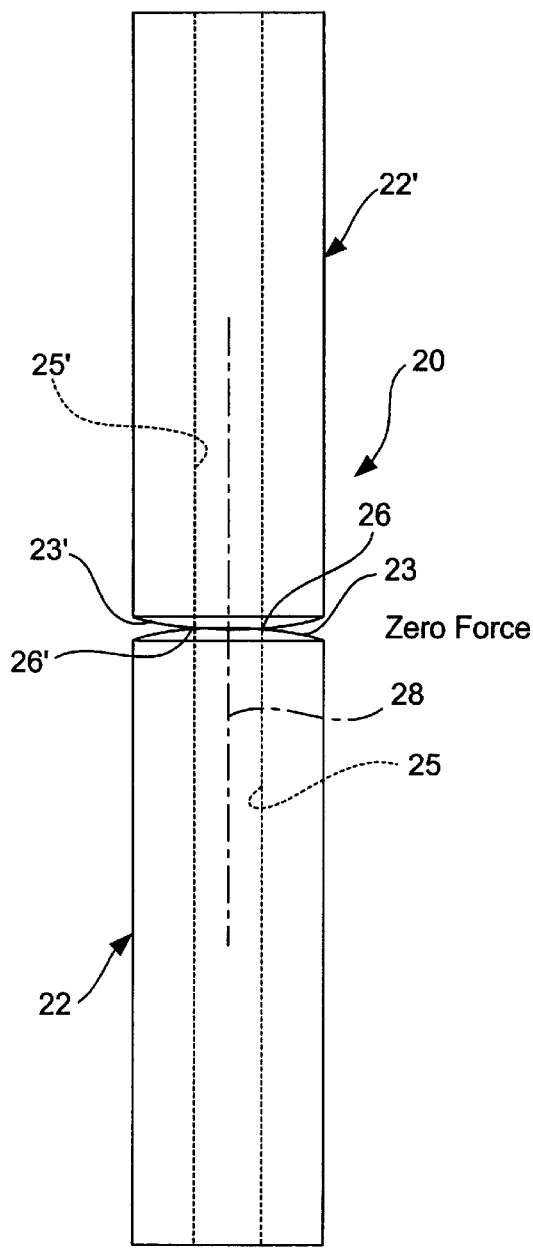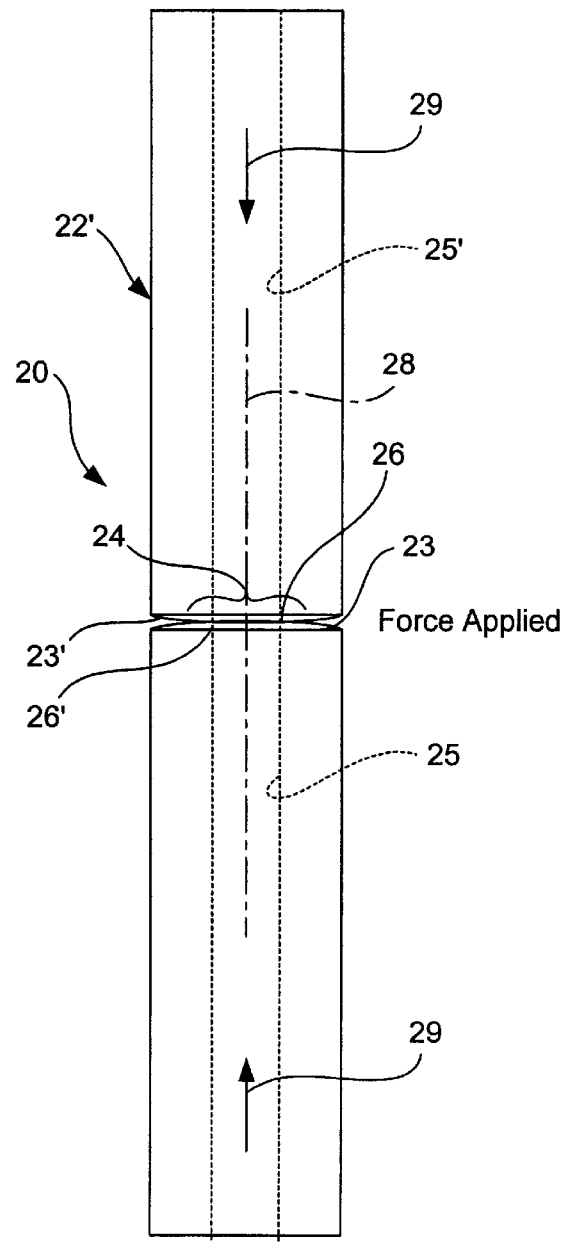
FIG. 3A  FIG. 3B

TUBE SEALING ASSEMBLY

TECHNICAL FIELD

The present invention relates to connectors for tube assemblies, and more particularity, relates to a ferrule-less connectors for tubes in high pressure fluid systems.

BACKGROUND ART

Modern instruments and equipment applied in high pressure liquid systems have inherently become more complex. This axiom also applies to tube connectivity and interchangeability where instrument designers are challenged to connect fluid and gas lines easily, reliably and inexpensively.

Generally, compression ferrules are employed as reliable and simple fluid line connections in high pressure liquid systems such as High Pressure Liquid Chromatography (HPLC) and DNA sequencing systems. These compression ferrules are relatively small conical structures which cooperate with one or two-piece tube fittings, such as Poly-Ether-Ether Ketone (PEEK) fittings, to form fluid-tight connections to the instrument tubing. Typical of such compression ferrules fittings are the RHEFLEX® Precision, Twist-Free and Flangeless PEEK Fittings by Rheodyne, L. P. of Rohnert Park, Calif.

Although these compression ferrules provide simple and reliable fluid connections in high pressure fluid environments, the fabrication costs associated with these devices and their corresponding fittings can quickly escalate as the number of fluid connections multiply. Such devices require precise machining of detailed ports where two fluid lines connect together, or where the fluid lines interconnect to components such as fluid manifolds and valves, for instance. As the number of these fluid interconnections increase, thus, the consequential cost of machined parts, and/or the cost of production tooling increases.

Moreover, modern drag discovery and high throughput screening, which utilize these high pressure liquid systems and instruments, substantially multiply the number of specimens simultaneously sampled. The amount of interconnections quickly becomes problematic. Especially considering that each connection/reconnection typically may require compression ferrule replacement.

With the advent of miniaturization, connecting to the outside world will become even more imperative. Thus, there is an increased need for simple, reliable and cost effective fluid connections for high and low pressure fluid systems.

DISCLOSURE OF INVENTION

The present invention provides a high pressure tube assembly adapted for liquid sealing against a rigid surface, having a connecting conduit, in a high pressure liquid application. The tube assembly includes a rigid, elongated, tube member having a spherical sector-shaped distal end portion with a spherical radius substantially larger than the radius of the tube member. The end detail could also be elliptical, parabolic, or machined such that most of the material around the through hole is removed, leaving an easily deformable surface to create a seal with applied force. The tube member includes a central conduit terminating at an apex of the spherical sector-shaped distal end portion to define an annular rim portion such that a fluid-tight seal can be formed between the central conduit of the tube member and the connecting conduit of the surface. This seal is formed at a contact interface between the rim portion and the surface when a relative axial force is applied therebetween.

Accordingly, the greater the axial force, the greater the area of the contact interface as the rim portion increasingly deforms. Consequently, the sealing integrity between rim portion and the rigid surface is increased.

In another aspect of the present invention, a method of forming a high pressure liquid seal against a rigid surface is provided. The method includes providing a rigid, elongated, tube member having a spherical sector-shaped distal end portion with a radius substantially larger than the radius of the tube member. The tube member further includes a central conduit terminating at an apex of the spherical sector-shaped distal end portion to define an annular rim portion. The method of the present invention further includes applying a compression force in al axial direction of the tube member to one of tube member and the rigid surface. This axial force forms a fluid-tight seal between the central conduit of the tube member and the connecting conduit of the surface at a contact interface between the rim portion and the surface.

In yet another aspect of the present invention, a fluid fitting assembly is provided for a fluid-tight coupling to a connecting conduit on a rigid surface of a body member. The fitting assembly includes a connector fitting formed to couple to the body member, and a rigid, elongated, tube member having a central conduit terminating at a contacting end thereof. The tube member is slideably coupled to the connector fitting for sliding movement of the contacting end toward and away from the connecting conduit of the body rigid surface. A biasing device is coupled between the connector fitting and the tube member for biasing the contacting end into abutting contact with the rigid surface. This device generates a biasing force sufficient to form a fluid-tight seal between the central conduit of the tube member and the connecting conduit of the body rigid surface when the connector fitting is coupled to the body member.

In one embodiment, the connector fitting further includes an interior proximal shoulder portion and an interior distal shoulder portion defining the opposed ends of a cavity extending generally coaxial with the tube passage. Further, the biasing device includes a compression spring which is disposed in the cavity. One end of the spring abuts the distal shoulder portion of the connector fitting, while an opposite end is coupled to the tube member to bias the tube member toward the body rigid surface.

In still another aspect of the present invention, a fluid fitting system is included for a High Pressure Liquid device. The fitting system includes a fluid manifold body having a plurality of connecting conduits terminating at a rigid surface, and a connector fitting formed to couple to the manifold body. A plurality of rigid, elongated, tube members are provided with each having a central conduit terminating at a respective contacting end thereof. Each tube member is slideably coupled to the connector fitting for sliding movement of the respective contacting end toward a corresponding connecting conduit of the body rigid surface. A biasing device is coupled between the connector fitting and each tube member for biasing the respective contacting end into abutting contact with the rigid surface. This biasing force is sufficient to form a fluid-tight seal between the central conduit of the tube member and the respective connecting conduit of the body rigid surface when the connector fitting is coupled to the body member.

BRIEF DESCRIPTION OF THE DRAWING

The assembly of the present invention has other objects and features of advantage which will be more readily apparent from the following description of the best mode of carrying out the invention and the appended claims, when taken in conjunction with the accompanying drawing, in which:

FIGS. 1A and 1B are a sequence of side elevation views of the tube sealing system constructed in accordance with the present invention, at zero force and with an axial force applied.

FIGS. 3A and 3B are a sequence of side elevation views of an alternative embodiment tube sealing system having two opposed tube members, at zero force and with an axial force applied.

BEST MODE OF CARRYING OUT THE INVENTION

Figure 5:
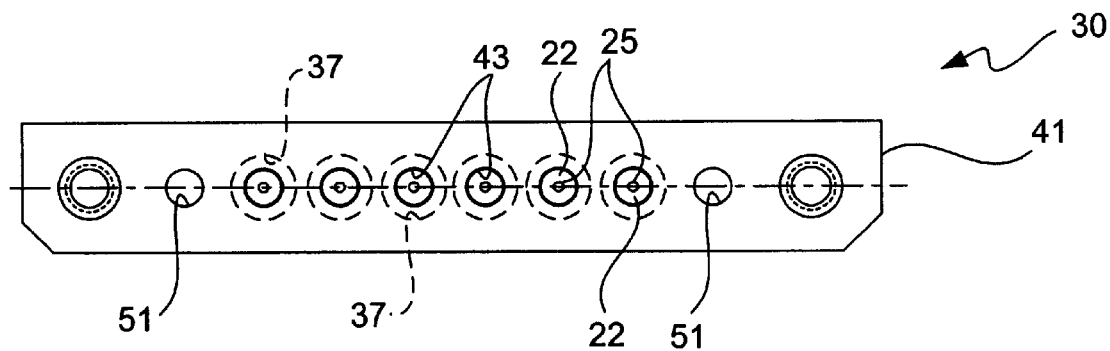
FIG. 5 is a bottom plan view of the fluid fitting system of FIG. 4.

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Figure 2:
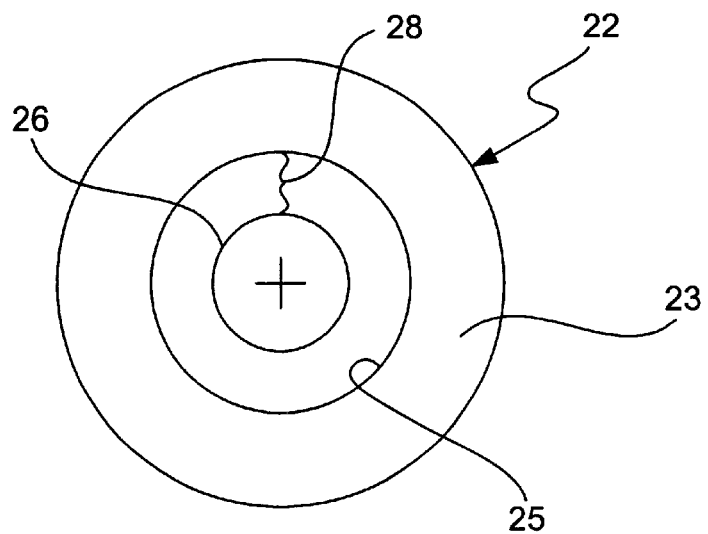
FIG. 2 is an enlarged top plan view of the tube sealing system taken substantially along the plane of the line 2—2 in FIG. 1B, and illustrating the contact interface surface.

Referring now to FIGS. 1–2, a tube sealing assembly, generally designated 20, is provided which is adapted to form a liquid seal against a rigid surface 21 in high pressure fluid handling systems. The tube assembly 20 includes a rigid, elongated, tube member 22 having a spherical sector-shaped distal end portion, generally designated 23, with a radius ($R_1$) substantially larger than the radius ($R_2$) of the tube member 22. The tube member 22 includes a central conduit 25 terminating at an apex of the spherical sector-shaped distal end portion 23 to define an annular rim portion 26 such that a fluid-tight seal can be formed between the central conduit 25 of the tube member 22 and a connecting conduit 27 in fluid communication with the rigid surface 21. This seal is formed at a contact interface 24 (FIG. 2) between the deformation of the rim portion 26 and the rigid surface 21 when a relative axial force is applied therebetween (FIG. 1A).

Accordingly, the spherical sector-shaped distal end portion forms an annular-shaped rim portion surrounding the central conduit 25 where the contact area at contact interface 24 is substantially smaller than that of the general transverse cross-sectional dimension of the tube member. The axial force applied between the tube member 22 and the rigid surface 21, therefore, is concentrated at the rim portion. Deformation of the rim portion against the rigid surface 21, to provide fluid sealing, can be attained applying smaller axial forces than if the distal end portion of the tube member 22 were substantially planar. Moreover, in the present invention, increases in the axial force will cause greater deformation which not only increases the area of the contact surface, but also the pressure at this interface (FIG. 2). Consequently, the sealing integrity between rim portion and the rigid surface is increased, enabling a direct connection without the application of ferrules or additional connector hardware.

At best viewed in FIG. 1A, the tube member 22 is provided by a substantially rigid cylindrical shaft having a generally uniform diameter, at least near the distal end portion 23. The tube member, however as defined herein, may be any cross-sectional shape and non-uniform. In accordance with the present invention, nonetheless, the distal end portion 23 of the rigid tube member must be configured to sufficiently deform when a relative axial force is applied in the direction of arrow 29 in FIG. 1B. While the tube member 22 is composed of a substantially rigid material, the distal end portion 23 will experience localized deformation when the axial force is concentrated at the rim portion 26. Such inert material providing these properties include glass, plastic, metal and ceramics.

Preferably, the tube member 22 has an outer diameter in range of 0.02 inch to about 0.25 inch, while the central conduit 25 has an inner diameter in range of 0.002 inch to about 0.125 inch. Moreover, the distal end portion 23 of the tube member 22 tapers inwardly toward the tip portion and terminates at an apex thereof which is further oriented in substantial coaxial alignment with the longitudinal axis 28 of the tube member 22. Thus, the opening into the central conduit 25 is also positioned at the apex of the spherical sector, which in turn defines the rim portion 26.

While the distal end portion is preferably semi-spherical or spherical sector-shaped, it may also be conical, trapezoidal, elliptical, parabolic, or even irregularshaped. Generally, the distal end portion should terminate at an apex, forming a rim portion surrounding the opening into the central conduit 25. The radius of the distal end portion, therefore, need not be fabricated so that it is perfectly spherical. It will be appreciated that any detail that forms a minimal center area or rim surrounding the central conduit 25 is functional where the distal end portion surface vertically recedes or drops off immediately from the apex or rim portion, as the radial distance increases from the conduit Thus, when a relative axial force is applied, the distal end portion deformably seals against a rigid surface to induce sealing.

Moreover, in this sealing configuration, as the axial force is increased, the surface area at the contact interface 24 increases as the rim portion increasingly deforms against the rigid surface. Consequently, the sealing integrity between rim portion and this rigid surface is increased to provide improved sealing properties.

Preferably, however, the distal end portion 23 of the tube member is spherical sector-shaped having a radius ($R_1$) substantially larger than the radius ($R_2$) of the tube member 22. For example, a tube member composed of PEEK will preferably have a radius ($R_1$) of the spherical sector-shaped end in the range of is about 0.5 inch to about 2.0 inch, while the radius ($R_2$) of the tube member 22 is in the range of about 0.04 inch to about 0.125 inch. Accordingly, the ratio of the $R_1$:$R_2$ is in the range of about 4:1 to about 50:1.

As a further example of the sealing system of the present invention, two opposed tube members 22, 22', having opposed distal end portions 23, 23' constructed in accordance with the present invention, are provided in FIGS. 3A and 3B. Accordingly, applying an axial force to either tube member 22, 22', or both, in opposed relation to one another (arrows 29), a sufficient seal is formed at the contact interface 24. As best viewed in FIG. 3B, upon coaxial alignment between the central conduits 25, 25' of the tube members 22, 22', and through the application of the axial force, the respective rim portions 26, 26' will slightly deform or flatten against one another to form a small diameter sealing surface (i.e., the contact interface 24) for sealing thereof. In this configuration, it will be appreciated, the rigid surface is essentially provided by the opposed spherical sector end portion 23' of the opposed tube member 22'. Alternatively, the contact interface 24 at the rim portion could be slightly pre-flattened through machinery to facilitate flattened contact.

In this instance, to assure proper sealing, the relative axial force should be in the range of about 0.5 lbs. to about 5.0 lbs. Given the small surface area at the contact interface, the axial forces will be concentrated there at creating a sealing pressure in the range of about 100 psi to about 1000 psi.

Figure 4A:
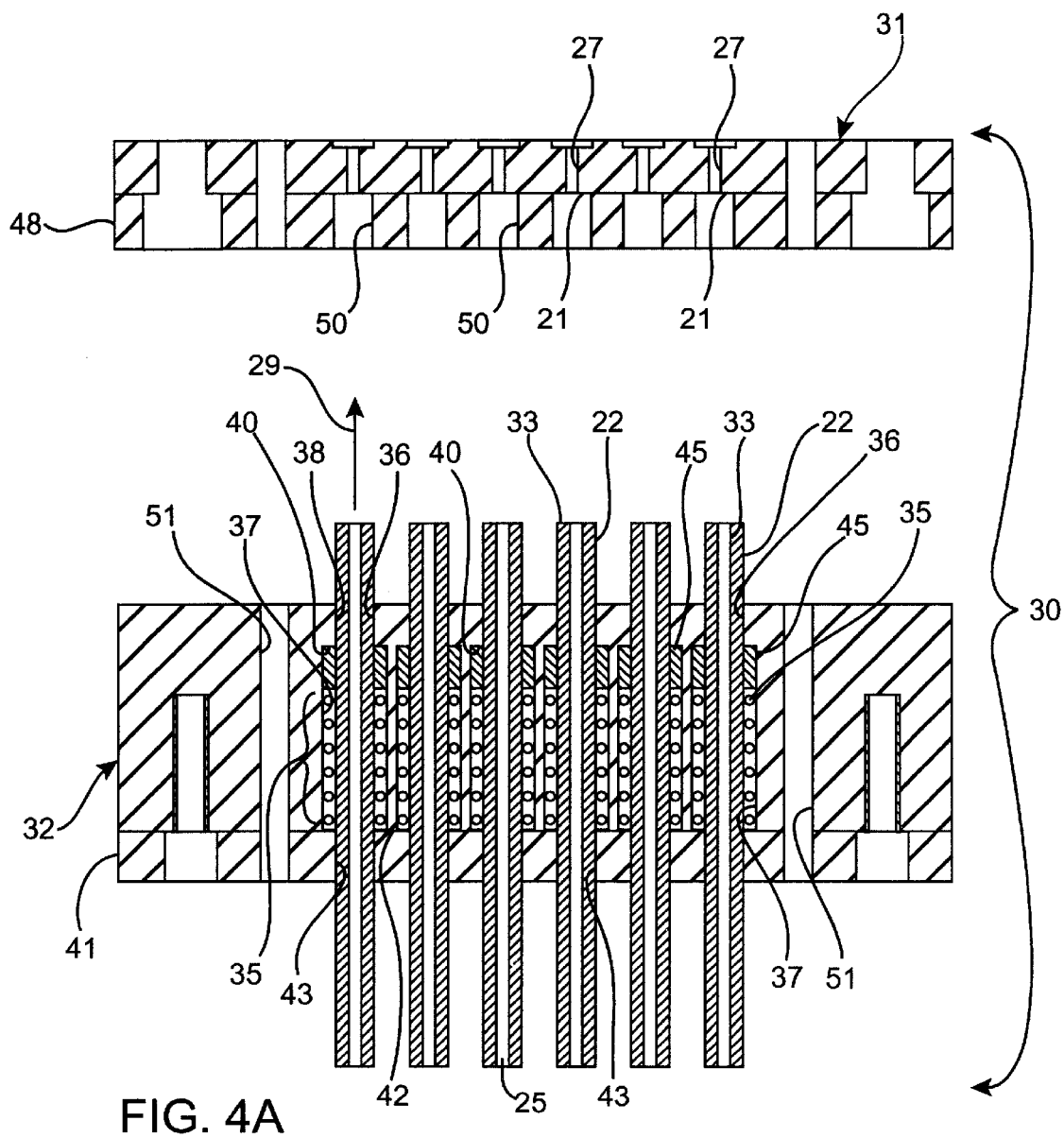
FIGS. 4A and 4B are a sequence of side elevation views, in cross-section, of a fluid fitting system constructed in accordance with the present invention, and illustrating mounting to a fluid manifold.
Figure 4B:
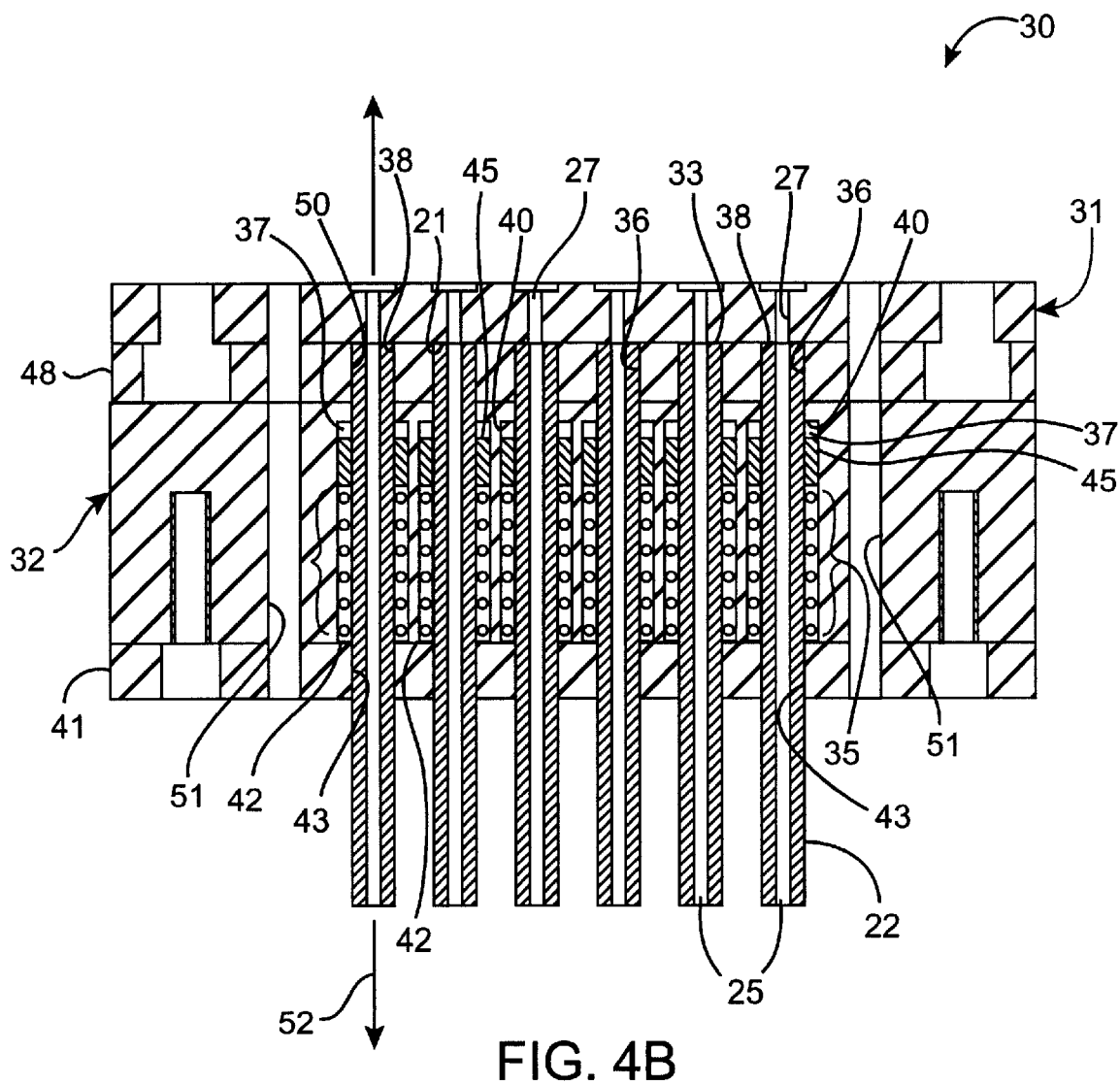

In another aspect of the present invention, as best viewed in FIGS. 4A and 4B, a fluid fitting assembly, generally designated 30, is provided which includes a fluid manifold body 31 of a fluid handling system having a plurality of connecting conduits 27 terminating at a rigid surface 21. These connecting conduits 27 of the manifold body will be fluid connected to selected aspiration sources and dispensing sources (not shown) which communicate with a valve assembly for switching fluid communication of the conduits therebetween. In this configuration, the fluid fitting assembly 30 includes a connector fitting 32 formed to couple to the manifold body 31. The connector fitting 32 supports a plurality of rigid, elongated, tube or nozzle members 22 each having a central conduit 25 terminating at a respective contacting end 33 thereof. Each tube member 22 is slideably coupled to the connector fitting 32 for sliding movement of the respective contacting end 33 toward a corresponding connecting conduit 27 of the body rigid surface 21 between released position (FIG. 4A) and an engaged position (FIG. 4B). A biasing device 35 is coupled between the connector fitting 32 and each tube member 22 for biasing the respective contacting end 33, via a shoulder 45, into abutting contact with the rigid surface 21. The force provided by the biasing device must be sufficient to form a fluid-tight seal between the central conduit 25 of the tube member 22 and the respective connecting conduit 27 of the body rigid surface 21 when the connector fitting is coupled to the body member.

Accordingly, this fluid fitting assembly 30 enables a bank or a plurality of tube members 22 to be mounted as a unit to the manifold body 31 which in turn aligns the central conduits 25 of each tube member 22 with the connecting conduits 27 of the manifold body. A biasing device 35 further urges the contacting ends 33 of the tube member 22 into direct abutting contact with the rigid surface 21 by an amount sufficient to form a fluid-tight seal between the tube member contacting end 33 and the body rigid surface 21. Hence, this design substantially simplifies the interchangeability of the nozzle or tube member components since tie plurality of nozzles can be mounted as a single unit, and such direct connections are accomplished without the application of ferrule connections. Moreover, this arrangement is particularly suitable for large-scale, multi-channel fluid handling systems such as High Pressure Liquid Chromatography (HPLC) and DNA sequencing systems. Typical of these designs are disclosed in U.S. patent application Ser. No. 09/689,548, filed Oct. 11, 2000, entitled "HYBRID VALVE APPARATUS SYSTEM AND METHOD FOR FLUID HANDLING, and incorporated by reference in its entirety.

Preferably, each distal contacting end 33 of the tube members 22 includes a spherical sector-shaped end as above-mentioned. Thus, when each contacting end 33 directly abuts the rigid surface 21, as shown in the engaged position of FIG. 4B, the biasing device exerts a biasing force on each tube member in the direction of arrow 29, to form a fluid tight seal between the corresponding central conduit 25 and the connecting conduit 27.

More particularly, the connector fitting 32 defines a plurality of vertically oriented tube passages 36 extending therethrough. Each tube passage 36 is formed and dimensioned for axial sliding receipt of a respective tube member 22 therein. As will be apparent, when the connector fitting 32 if fixedly mounted to the manifold body 31, each nozzle member 22 slides axially along a corresponding tube passage 36 from the release position (FIG. 4A) to the engaged position (FIG. 4B).

Extending inwardly from a distal end opening into the tube passage 36 is a cylindrical cavity portion 37 oriented substantially co-axial and concentric to the axis of the tube passage 36 (FIG. 5). The diameter of the cavity portion 37 is larger than that of the tube passage proximal opening 38 into the tube passage, and is defined at a proximal portion thereof by an interior proximal shoulder portion 40. As shown in FIGS. 4A and 4B, this cavity portion 37 accommodates axial receipt of the biasing device 35 therein which cooperates with the corresponding tube member 22 to urge the distal end portion 23 in the direction of arrow 29.

In the preferred form, the biasing device 35 is provided by a compression spring 35 positioned functionally between the connector fitting 32 and the corresponding tube member 22. Thus, the compression spring 35, which is positioned around the tube member 22, must have an inner diameter sized for receipt of the tube member 22 therein, while having an outer diameter sized for receipt thereof in the cavity portion 37.

A bottom plate 41 is positioned over the distal end portion of the connector fitting 32 to enclose the coiled compression springs 35 in each corresponding cavity portions 37 concentrically positioned about the respective tube member 22. Thus, at the proximal end of the cavity portion 37 is the interior proximal shoulder portion 40, while an opposite end of the cavity is an interior distal shoulder portion 42. This distal shoulder portion 42 is actually provided by the bottom plate 41 which includes a tube aperture 43 sized for longitudinal receipt of the tube member therein.

Preferably, the tolerance between the outer diameter dimension of the tube members 22 and the diameter of the proximal opening 38 and tube aperture 43 of the tube passage 36 should be in the range of about 0.02 mm to about 0.10 mm. This tolerance assures that the tube member 22 will properly slide axially in the tube passage 36 substantially unencumbered, while further minimizing the slack or looseness therebetween to assure proper alignment between the tube central conduit 25 and the manifold connecting conduit 27.

To urge the contacting ends 33 of the tube members in the direction of arrow 29, a distal end of the coiled compression spring 35 abuts the interior distal shoulder portion 42 while the opposite proximal end of the spring contacts a spring stop 45 fixedly coupled to the tube member 22. This spring stop 45 is cylindrical in dimension and has an outer diameter enabling substantially unencumbered axial sliding receipt in the cavity portion 37. To affix this collar or stop 45 to the tube member 22, crimping or the application of conventional adhesives may be used.

When the spring 35 and spring stop are loaded in the cavity portion 37 of the tube passage 36, an upper contact end of the spring stop 45 contacts the proximal end portion of the compression spring to bias and urge the respective tube member 22 in the direction of arrow 29. In the released position (FIG. 4A), however, an opposed lower abutting end of the spring stop 45 contacts the interior proximal shoulder portion 40 of the cavity portion 37 to limit the displacement of the tube member 22.

In the preferred form, the manifold body 31 includes an alignment plate 48 having a plurality of alignment apertures 50 substantially concentrically aligned with the corresponding connecting conduits 27. These alignment apertures 50 of the alignment plate 48 are formed and dimensioned for sliding receipt of the contacting ends 33 of the respective tube members 22 therein. Such sliding receipt is relatively snug, but allows sufficient, aligned axial displacement of the tube member contacting ends in the apertures 50 to assure proper fluid-tight sealing contact of the contacting end 33 with the rigid surface 21 of the manifold body 31.

Accordingly, when the connector fitting 32 is fixedly mounted to the manifold body 31, either by bolts (not shown) extending through alignment passages 51, clamping or other conventional mounting techniques, the contacting ends 33 of the respective tube member 22 are slideably received in the alignment apertures 50. Upon further mounting movement of the connector fitting 32 to the manifold body 31, the tube member contacting end 33 contacts the manifold rigid surface 21 causing relative displacement of the tube member 22 in the direction of arrow 52, opposite the spring force direction (arrow 29). Such contact compresses the compression springs 35 displacing the tube member 22 and the corresponding spring stop 45 distally into the cavity portion 37.

In accordance with the present invention, when the connector fitting 32 is urged against the manifold body 31, in the engaged position shown in FIG. 4B, the biasing force exerted by the compression spring 35 is sufficient to form a fluid-tight seal between the contacting ends 33 of the tube member 22 and the rigid surfaces 21 of the manifold. Beneficially, these nozzle member 22 can be mounted to and seal against the manifold generally simultaneously.

As mentioned, for relatively rigid components such as glass, synthetics or stainless steel, the relative axial force should be in the range of about 1.0 lb. to about 10.0 lbs.

Although only a few embodiments of the present inventions have been described in detail, it should be understood that the present inventions may be embodied in many other specific forms without departing from the spirit or scope of the inventions.

What is claimed is:

1. A method of forming a fluid-tight seal between a nozzle connecting assembly and a substantially rigid surface of a fluid manifold body having a connecting conduit comprising:

providing a connector fitting formed to couple to the fluid manifold body;

providing a substantially rigid, elongated, nozzle member including a central conduit having a fluid receiving end terminating at a contacting end of the nozzle member, and a fluid dispensing end terminating at a distal nozzle end of the nozzle member, said contacting end tapering inwardly toward a contact rim having a contact area substantially smaller than the transverse cross-sectional dimension of the nozzle member, said nozzle member being slideably coupled to the connector fitting for sliding movement of the contacting end toward and away from the connecting conduit of the rigid surface of the manifold body, and said nozzle end extending beyond the connector fitting to enable dispensing of a fluid from said distal nozzle end;

coupling the connector fitting to the manifold body;

applying a compression force in an axial direction of the nozzle member, upon said coupling, to one of said nozzle member and the manifold body sufficient to form a fluid-tight seal at the contacting end of the nozzle member between the central conduit thereof and the connecting conduit of the manifold body as the contact rim deformably increases in contact area against the rigid surface when the compression force is increasingly applied therebetween; and dispensing the fluid from the central conduit and out of the distal nozzle end.

2. The method as defined by claim 1, wherein the contact rim is situated substantially at an apex portion of the distal end portion.

3. The method as defined by claim 2, wherein the distal end portion of the nozzle member is one of elliptical, parabolic and spherical sector-shaped.

4. The method as defined by claim 2, wherein the distal end portion of the nozzle member is spherical sector-shaped, having a radius substantially larger than the radius of the nozzle member.

5. The method as defined by claim 1, wherein said compression force is in the range of about 1.0 lb. to about 5.0 lbs.

6. The method as defined by claim 1 further including: substantially co-axially aligning the central conduit of the nozzle member with the connecting conduit of the manifold body upon said coupling.

7. The method as defined by claim 6, wherein said aligning includes inserting the contacting end of the nozzle member into an alignment aperture substantially co-axially aligned with the connecting conduit of the manifold body, and formed for sliding receipt of the contacting end therein.

8. A nozzle connecting assembly for a fluid-tight coupling to a connecting conduit on a substantially rigid surface of a body member, said nozzle connecting assembly comprising:

a connector fitting formed to couple to the body member;

a substantially rigid, elongated, nozzle member including a central conduit having a fluid receiving end terminating at a contacting end of the nozzle member, and a fluid dispensing end terminating at a distal nozzle end of the nozzle member, said nozzle member being slideably coupled to the connector fitting for sliding movement of the contacting end toward and away from the connecting conduit of the body rigid surface, and said nozzle end extending beyond the connector fitting; and a biasing device coupled between the connector fitting and the nozzle member for biasing said contacting end into direct abutting contact with the rigid surface with a biasing force sufficient to form a fluid-tight seal at the contacting end of the nozzle member between the central conduit thereof and the connecting conduit of the body rigid surface when the connector fitting is coupled to the body member to dispense fluid from the central conduit and out of said distal nozzle end.

9. The nozzle connecting assembly of claim 8, wherein said connector fitting includes a nozzle passage extending therethrough, and formed and dimensioned for sliding receipt of the nozzle member therein.

10. The nozzle connecting assembly of claim 8, wherein said biasing device includes a compression spring.

11. The nozzle connecting assembly of claim 10, wherein
said connector fitting further includes an interior proximal shoulder portion and an interior distal shoulder portion defining the opposed ends of a cavity extending generally coaxial with the nozzle passage, and
said compression spring is disposed in said cavity having one end abutting the distal shoulder portion of the connector fitting, and an opposite end coupled to the nozzle member to bias the nozzle member toward the body rigid surface.

12. The nozzle connecting assembly of claim 11, further including:
a spring stop disposed in said cavity in abutting contact with the opposite end of said spring, said spring stop being affixed to said nozzle member in a manner transferring the compression force of the spring to the nozzle member.

13. The nozzle connecting assembly of claim 8, further including:
alignment structure adapted to co-axially align the central conduit of the nozzle member with the connecting conduit of the body member when the connector fitting is coupled to the body member.

14. The nozzle connecting assembly of claim 13, wherein
said alignment structure defining an alignment aperture in co-axial alignment with said connecting conduit, and formed for sliding receipt of the contacting end of the nozzle member when the connector fitting is coupled to the body member.

15. The nozzle connecting assembly of claim 8, wherein
the contacting end of the nozzle member tapers inwardly to define an annular rim portion such that the fluid-tight seal can be formed between the central conduit of the nozzle member and the connecting conduit of the surface at a contact interface between the rim portion and the surface when the biasing force is applied therebetween.

16. The nozzle connecting assembly of claim 15, wherein
the annular rim portion is situated substantially at an apex portion of the contacting end.

17. The nozzle connecting assembly of claim 16, wherein
the contacting end of the nozzle member is one of elliptical, parabolic and spherical sector-shaped.

18. The nozzle connecting assembly of claim 16, wherein
the contacting end of the nozzle member is spherical sector-shaped with a radius substantially larger than the radius of the nozzle member.

19. A fluid fitting system for a connecting fluid lines comprising:
a fluid manifold body defining one or more fluid connecting conduits terminating at a substantially rigid surface;
a connector fitting formed to rigidly affix to the manifold body;
one or more substantially rigid, elongated, tube members each having a central conduit terminating at a respective contacting end thereof, each tube member being slideably coupled to the connector fitting for sliding movement of the respective contacting end toward a corresponding connecting conduit of the body rigid surface; and
a biasing device coupled between the connector fitting and an associated tube member for biasing the respective contacting end into direct abutting contact with the body rigid surface by an sufficient to form a fluid-tight seal at the contacting end of the tube member between the central conduit thereof and the respective connecting conduit of the body rigid surface when the connector fitting is coupled to the body member to dispense fluid through the central conduit of the tube member.

20. The fluid fitting system of claim 19, wherein
said connector fitting includes one or more tube passages each extending therethrough, and each formed and dimensioned for sliding receipt of a corresponding tube member therein.

21. The fluid fitting system of claim 19, wherein
said biasing device includes one or more compression springs corresponding to an associated tube member.

22. The fluid fitting system of claim 21, wherein
said connector fitting further includes one or more of interior proximal shoulder portions and corresponding interior distal shoulder portions each of which defines the opposed ends of a cavity extending generally coaxial with the corresponding tube passage, and
each said compression spring is disposed in a corresponding cavity having one end abutting the corresponding distal shoulder portion of the connector fitting, and an opposite end coupled to the corresponding tube member to bias the tube member toward the body rigid surface.

23. The fluid fitting system of claim 22, further including:
one or more spring stops each disposed in a corresponding cavity in abutting contact with the opposite end of each said spring, each said spring stop being affixed to the corresponding tube member in a manner transferring the compression force of the spring to the corresponding tube member.

24. The fluid fitting system of claim 19, further including;
an alignment device adapted to facilitate alignment of the each central conduit of the contacting end of the tube member with the corresponding connecting conduit on the rigid surface.

25. The fluid fitting assembly of claim 19, wherein
the contacting ends of each tube member taper inwardly to define a respective annular rim portion such that the fluid-tight seal can be formed between each central conduit of the tube members and the corresponding connecting conduit of the rigid surfaces at a respective contact interface between the rim portions and the surfaces when the biasing force is applied therebetween.

26. The fluid fitting assembly of claim 25, wherein
each of the annular rim portions is situated substantially at an apex portion of the contacting ends.

27. The fluid fitting assembly of claim 26, wherein
each contacting end of the tube members is one of elliptical, parabolic and spherical sector-shaped.

28. The fluid fitting assembly of claim 26, wherein
each contacting end of the tube members is spherical sector-shaped with a radius substantially larger than the radius of the corresponding tube member.

29. The fluid fitting assembly of claim 28, wherein
the ratio of each of the radius of the spherical sector to the radius of the tube member is in the range of about 4:1 and 50:1.

30. A fluid fitting system for a connecting fluid lines comprising:
a fluid manifold body having one or more connecting conduits terminating at a substantially rigid surface thereof;
a connector fitting formed to couple to the manifold body, and defining one or more tube passages each extending therethrough;

one or more substantially rigid, elongated, tube members each having a central conduit terminating at a respective contacting end thereof, the corresponding tube member being slideably received in a corresponding tube passage of the connector fitting for sliding movement of the respective contacting end toward a corresponding connecting conduit of the substantially rigid surface of the manifold body; and a biasing device coupled between the connector fitting and each tube member for biasing the respective contacting end into direct abutting contact with the body substantially rigid surface by an amount sufficient to form a fluid-tight seal at the contacting end of the tube member between the central conduit thereof and the respective connecting conduit of the body substantially rigid surface when the connector fitting is coupled to the body member to dispense fluid through the central conduit of the tube member.

31. The fluid fitting system of claim 30, further including:

alignment structure adapted to facilitate alignment of an associated central conduit of the contacting end of the tube member with the corresponding connecting conduit on the rigid surface.

32. The fluid fitting assembly of claim 30, wherein the contacting end of the corresponding tube member tapers inwardly to define a respective annular rim portion such that the fluid-tight seal can be formed between the central conduit of the tube member and the corresponding connecting conduit of the body substantially rigid surface at the corresponding contact interface between the rim portion and the body substantially rigid surface when the biasing force is applied therebetween.

33. The fluid fitting assembly of claim 32, wherein the corresponding annular rim portion is situated substantially at an apex portion of the corresponding contacting end.

34. The fluid fitting assembly of claim 33, wherein the corresponding contacting end of the tube member is one of elliptical, parabolic and spherical sector-shaped.

35. The fluid fitting assembly of claim 33, wherein the corresponding contacting end of the tube member is one of elliptical, parabolic and spherical sector-shaped.

36. A fluid fitting system for a connecting fluid lines comprising:

a fluid manifold body having one or more connecting conduits terminating at a substantially rigid surface thereof;

a connector fitting formed to couple to the manifold body;

one or more substantially rigid, elongated, tube members each having a central conduit terminating at a respective contacting end thereof, the corresponding tube member being slideably coupled to the connector fitting for sliding movement of the respective contacting end toward a corresponding connecting conduit of the substantially rigid surface of the manifold body;

a biasing device coupled between the connector fitting and the corresponding tube member for biasing the respective contacting end into direct abutting contact with the substantially rigid surface by an amount sufficient to form a fluid-tight seal at the contacting end of the tube member between the central conduit thereof and the respective connecting conduit of the body substantially rigid surface when the connector fitting is coupled to the body member to dispense fluid through the central conduit of the tube member; and alignment structure adapted to facilitate alignment of the corresponding central conduit of the contacting end of the tube member with the corresponding connecting conduit on the substantially rigid surface.

37. The fluid fitting system of claim 36, wherein said connector fitting includes one or more tube passages each extending therethrough, and each formed and dimensioned for sliding receipt of a corresponding tube member therein.

38. The fluid fitting system of claim 36, wherein said biasing including a corresponding compression spring for an associated tube member.

39. The fluid system of claim 38, wherein said connector fitting further includes one or more interior proximal shoulder portions and corresponding interior distal shoulder portions each of which defines the opposed ends of a cavity extending generally coaxial with the corresponding tube passage, and the corresponding compression spring is disposed in a corresponding cavity having one end abutting the corresponding distal shoulder portion of the connector fitting, and an opposite end coupled to the corresponding tube member to bias the corresponding tube member toward the body substantially rigid surface.

40. The fluid fitting system of claim 39, further including:

one or more spring stops disposed in a corresponding cavity in abutting contact with the opposite end of the corresponding spring, the corresponding spring stop being affixed to the corresponding tube member in a manner transferring the compression force of the spring to the corresponding tube member.

41. The fluid system of claim 36, wherein said alignment structure defining one or more alignment apertures in co-axial alignment with a corresponding connecting conduit, and formed for sliding receipt of a corresponding contacting end of the nozzle member when the connector fitting is coupled to the body member.

42. The fluid fitting assembly of claim 36, wherein the contacting end of the corresponding tube member tapers inwardly to define a respective annular rim portion such that the fluid-tight seal can be formed between the central conduit of the tube member and the corresponding connecting of the body substantially rigid surface at the corresponding contact interface between the rim portion and the body substantially rigid surface when the biasing force is applied therebetween.

43. The fluid fitting assembly of claim 42, wherein the corresponding annular rim portion is situated substantially at an apex portion of the corresponding contacting end.

44. The fluid fitting assembly of claim 36, wherein the corresponding annular rim portion is situated substantially at an apex portion of the corresponding contacting end.

45. The fluid fitting assembly of claim 44, wherein the corresponding contacting end of the tube member is one of elliptical, parabolic and spherical sector-shaped.

46. A fluid system for a connecting fluid lines comprising:

a fluid manifold body having one or more connecting conduits terminating at a substantially rigid surface;

a connector fitting formed to couple to the manifold body;

one or more substantially rigid, elongated, tube members each having a central conduit terminating at a respective contacting end thereof, the contacting end of the corresponding tube member tapers inwardly to define a respective annular rim portion, each tube member being slideably coupled to the connector fitting for sliding movement of the respective contacting end toward a corresponding connecting conduit of the body substantially rigid surface; and a biasing device coupled between the connector fitting and each tube member for biasing the respective annular rim portion into direct abutting contact with the substantially rigid surface to form a corresponding contact interface therebetween, and by an amount sufficient to enable a fluid-tight seal at the contacting end of the tube member between the central conduit thereof and the respective connecting conduit of the body substantially rigid surface when the connector fitting is coupled to the body member to dispense fluid through the central conduit of the tube member.

47. The fluid fitting system of claim 46, wherein said biasing device includes one or more compression springs corresponding to each tube member.

48. The fluid fitting system of claim 47, wherein said connector fitting further includes one or more interior proximal shoulder portions and corresponding interior distal shoulder portions each of which defines the opposed ends of a cavity extending generally coaxial with the corresponding tube passage, and each said compression spring is disposed in a corresponding cavity having one end abutting the corresponding distal shoulder portion of the connector fitting, and an opposite end coupled to the corresponding tube member to bias the tube member toward the body substantially rigid surface.

49. The fluid fitting system of claim 48, further including:

one or more spring stops disposed in a corresponding cavity in abutting contact with the opposite end of the corresponding spring, the corresponding spring stop being affixed to the corresponding tube member in a manner transferring the compression force of the spring to the corresponding tube member.

50. A nozzle connecting assembly for dispensing a fluid comprising:

a fluid manifold having one or more connecting conduits terminating at a substantially rigid surface;

a connector fitting formed to couple to the manifold, and defining one or more tube passages each extending therethrough;

one or more substantially rigid, elongated, nozzles each including a central conduit having a fluid receiving end terminating at a contacting end of the nozzle, and a fluid dispensing end terminating at a distal nozzle end of the nozzle member, the corresponding nozzle member being slideably coupled to the connector fitting for sliding movement of the respective contacting end toward and away from the corresponding connecting conduit of the manifold rigid surface, and the corresponding nozzle end extending beyond the connector fitting; and a biasing device coupled between the connector fitting and an associated nozzle for biasing the respective contacting end into direct abutting contact with the manifold rigid surface by an amount sufficient to form a fluid-tight seal at the contacting end of the nozzle between the central conduit thereof and the respective connecting conduit of the manifold rigid surface when the connector fitting is coupled to the fluid manifold to dispense fluid from the central conduit and out of said distal nozzle end.

51. The nozzle connecting assembly of claim 50, further including:

alignment structure adapted to co-axially align the central conduit of the nozzle with the corresponding connecting conduit of the manifold when the connector fitting is coupled thereto.

52. The nozzle connecting assembly of claim 51, wherein said alignment structure defines an alignment aperture in co-axial alignment with the corresponding connecting conduit, and formed for sliding receipt of the contacting end of the corresponding nozzle when the connector fitting is coupled to the manifold.

53. The fluid assembly of claim 52, wherein the contacting end of the corresponding nozzle tapers inwardly to define a respective annular rim portion such that the fluid-tight seal can be formed between the central conduit of the nozzle and the corresponding connecting conduit of the manifold substantially rigid surface at the corresponding contact interface between the rim portion and the body substantially rigid surface when the biasing force is applied therebetween.

* * * * *